United States Patent
Nakata

(10) Patent No.: US 7,851,107 B2
(45) Date of Patent: Dec. 14, 2010

(54) FUEL CELL SEPARATOR AND PRODUCTION METHOD THEREFOR

(75) Inventor: Hiromichi Nakata, Toyota (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 525 days.

(21) Appl. No.: 11/984,155

(22) Filed: Nov. 14, 2007

(65) Prior Publication Data

US 2008/0160390 A1  Jul. 3, 2008

Related U.S. Application Data

(62) Division of application No. 10/716,396, filed on Nov. 20, 2003, now abandoned.

(30) Foreign Application Priority Data

Dec. 4, 2002  (JP) .............................. 2002-351933

(51) Int. Cl.
*H01M 4/64* (2006.01)
(52) U.S. Cl. ...................... 429/518; 429/517; 429/519; 429/520; 429/521; 429/522
(58) Field of Classification Search ....................... None
See application file for complete search history.

(56) References Cited

U.S. PATENT DOCUMENTS

| | | | |
|---|---|---|---|
| 6,440,598 B1 | 8/2002 | Fukui et al. | |
| 6,893,765 B1 * | 5/2005 | Nishida et al. | 429/481 |
| 2003/0228510 A1 * | 12/2003 | Nakata et al. | 429/34 |

FOREIGN PATENT DOCUMENTS

| | | |
|---|---|---|
| CN | 1273699 A | 11/2000 |
| DE | 199 47 858 C2 | 4/2003 |
| DE | 102 43 349 A1 | 5/2003 |
| EP | 1 231 655 A1 | 8/2002 |
| EP | 1 369 942 A2 | 12/2003 |

(Continued)

OTHER PUBLICATIONS

Machine translation of JP 2001-093538.*

(Continued)

*Primary Examiner*—Patrick Ryan
*Assistant Examiner*—Cynthia Lee
(74) *Attorney, Agent, or Firm*—Kenyon & Kenyon LLP

(57) ABSTRACT

A low-cost fuel cell separator having a metallic substrate which is able to stably maintain low electric resistance (high electrical conductivity) and high corrosion resistance for a long period is provided. The separator has a metallic substrate having an oxide film forming a surface thereof and made from an oxidization of a metal of the substrate, and an electrically conductive thin film formed on a surface of the oxide film of the substrate. Due to this construction, low electric resistance (high electrical conductivity) is achieved by the electrically conductive thin film. Furthermore, even if the electrically conductive thin film has pinholes, the oxide film substantially prevents or reduces elution from the separator substrate, thereby achieving high corrosion resistance. Still further, since the oxide film is formed by oxidation of the substrate, the oxide film can be formed at a lower cost than an oxide film formed from a different metal.

4 Claims, 11 Drawing Sheets

FOREIGN PATENT DOCUMENTS

| | | | |
|---|---|---|---|
| JP | A-6-146006 | | 5/1994 |
| JP | A-11-121018 | | 4/1999 |
| JP | 2000-138067 | * | 5/2000 |
| JP | A-2000-138067 | | 5/2000 |
| JP | 2001-093538 | * | 4/2001 |
| JP | A 2001-93538 | | 4/2001 |
| JP | A 2001-351642 | | 12/2001 |
| JP | A 2002-170582 | | 6/2002 |
| WO | WO 00 40520 A1 | | 7/2000 |
| WO | WO 01/22513 | * | 3/2001 |
| WO | WO 01 28020 A1 | | 4/2001 |

OTHER PUBLICATIONS

Machine translation of JP 2000-138067.*

Canadian Official Communication, Appln. No. 2,450,987, issued Jan. 4, 2007.

IPDL JPO Machine Translation of JP Publication No. 2000-138067 (2000).

IPDL JPO Machine Translation of JP Publication No. 2001-093538 (2001).

Japanese Language Version of Official Communication letter, Appln. No. JP 2002-351933, issued Nov. 22, 2005 and English Translation of Official Communication letter, Appln. No. JP 2002-351933, issued Nov. 22, 2005.

Chinese Official Communication, Appln. No. 200310116965.9, issued Jun. 17, 2005 and English Translation of Chinese Official Communication, Appln. No. 200310116965.9, issued Jun. 17, 2005.

German Official Communication letter, Appln. No. 103 56 653.8, issued Apr. 6, 2005 and English Translation of German Official Communication letter, Appln. No. 103 56 653.8, issued Apr. 6, 2005.

* cited by examiner

CORROSION RESISTANCE OF Au
THIN FILM TYPE SEPARATOR
(AMOUNT OF ION ELUTION)

CORROSION RESISTANCE OF C
THIN FILM TYPE SEPARATOR
(AMOUNT OF ION ELUTION)

CONTACT RESISTANCE TEST METHOD

CONTACT RESISTANCE OF Au THIN FILM TYPE SEPARATOR BEFORE AND AFTER CORROSION TEST

CONTACT RESISTANCE OF C THIN FILM TYPE
SEPARATOR BEFORE AND AFTER CORROSION TEST

CONCEPTUAL ILLUSTRATION
OF ADHESION TEST

ADHESION OF Au THIN FILM TYPE SEPARATOR

ADHESION OF Au THIN FILM TYPE SEPARATOR

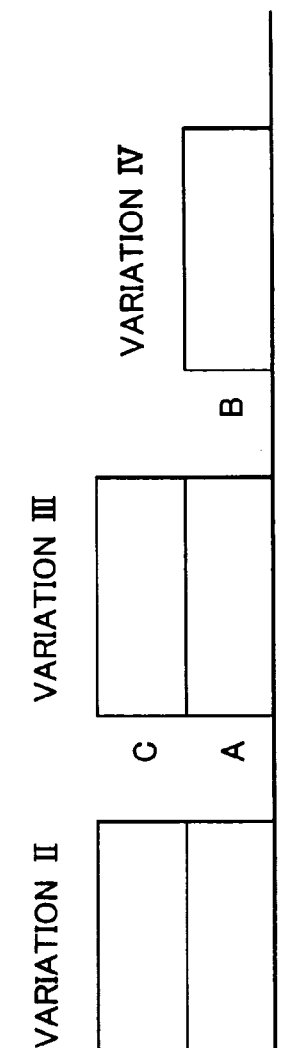
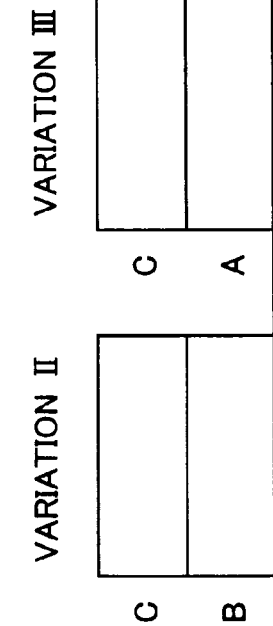
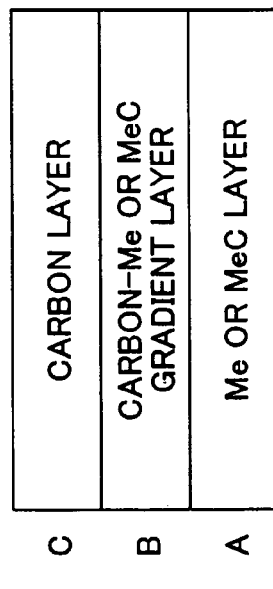
FIG. 14A  VARIATION I
C: CARBON LAYER
B: CARBON–Me OR MeC GRADIENT LAYER
A: Me OR MeC LAYER
METAL SEPARATOR
FIG. 14B  VARIATION II
C
B
METAL SEPARATOR
FIG. 14C  VARIATION III
C
A
METAL SEPARATOR
FIG. 14D  VARIATION IV
B
METAL SEPARATOR

FIG. 14E
VARIATION V

| | |
|---|---|
| G | CARBON LAYER |
| F | CARBON–Me(A) OR Me(A)C GRADIENT LAYER |
| E | Me(A) OR Me(A)C–Me(B) OR Me(B)C GRADIENT LAYER |
| D | Me(B) OR Me(B)C LAYER |

METAL SEPARATOR

FIG. 14F
VARIATION VI

| | |
|---|
| G |
| F |
| E |

METAL SEPARATOR

FIG. 14G
VARIATION VII

| | |
|---|
| G |
| E |
| D |

METAL SEPARATOR

FIG. 14H
VARIATION VIII

| | |
|---|
| F |
| E |

METAL SEPARATOR

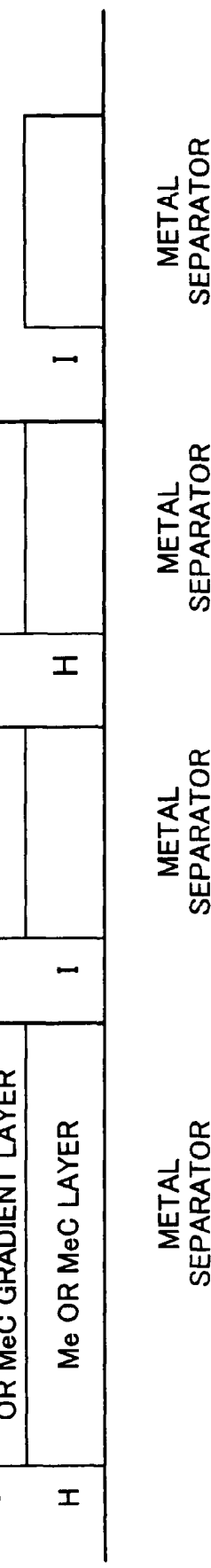
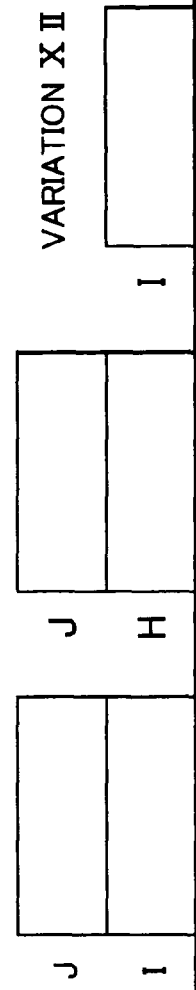
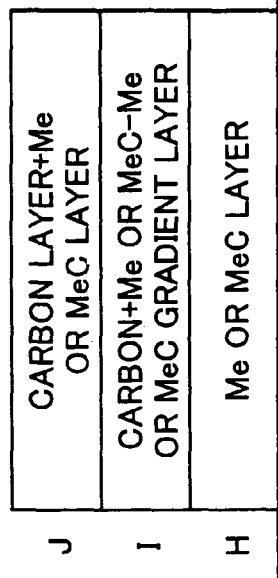
FIG. 14I  FIG. 14J  FIG. 14K  FIG. 14L

FUEL CELL SEPARATOR AND PRODUCTION METHOD THEREFOR

INCORPORATION BY REFERENCE

This is a divisional of U.S. application Ser. No. 10/716,396 filed Nov. 20, 2003, now abandoned which claims priority to Japanese Patent Application No. 2002-351933 filed Dec. 4, 2002, the contents of which are incorporated herein by reference.

BACKGROUND OF THE INVENTION

1. Field of the Invention

The invention relates to a fuel cell separator and production method therefor and, more particularly, to a structure of a surface-treated layer of a metal separator for a solid polymer electrolyte type fuel cell.

2. Description of the Related Art

A solid polymer electrolyte type fuel cell battery is formed by stacking modules each of which is formed by stacking at least one cell made up of a membrane-electrode assembly (hereinafter, referred to as "MEA") and a separator.

Each MEA is made up of an electrolyte membrane formed by an ion-exchange membrane, an electrode (anode) formed by a catalyst layer that is disposed on a surface of the electrolyte membrane, and an electrode (cathode) formed by a catalyst layer that is disposed on another surface of the electrolyte membrane. Normally, a diffusion layer is provided between the MEA and the separator. The diffusion layer facilitates the diffusion of a reaction gas into the catalyst layer. The separator has a fuel gas channel for supplying a fuel gas (hydrogen) to the anode, and an oxidizing gas channel for supplying an oxidizing gas (oxygen, or air in ordinary cases) to the cathode. The separator forms a passageway of electrons between adjacent cells.

Terminals (electrode plates), insulators, and end plates are disposed on two opposite ends of a cell stack in the cell stacking direction. The cell stack is clamped in the cell stacking direction, and is fixed through the use of fastener members (e.g., tension plates) that extend outside the cell stack in the cell stacking direction, and also through the use of bolts and nuts. In this manner, a stack is formed. On the anode side of a solid polymer electrolyte type fuel cell, a reaction occurs in which hydrogen is separated into hydrogen ions (protons) and electrons. The hydrogen ions migrate through the electrolyte membrane to the cathode side. On the cathode side, the hydrogen ions participate in a reaction with oxygen and electrons (i.e., electrons produced on the anode side of the adjacent MEA come to the cathode through the separator, or electrons produced on the anode side of the cell disposed at an end of the cell stack come to the cathode of the cell at the opposite end via an external circuit), thereby producing water.

Anode side: 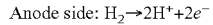

Cathode side: 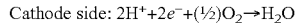

Since the separators need to have electrical conductivity, separators are normally formed of a metal, carbon, or an electrically conductive resin, or are formed by a combination of a metal separator and a resin frame. Carbon separators and electrically conductive resin separators are chemically stable and therefore maintain electrical conductivity even during contact with acid water. However, due to a strength requirement of bottom surfaces of channels formed in separators, the carbon separators and electrically conductive resin separators need to have relatively great thickness, thus resulting in an increased stack length. In contrast, the metal separators, having relatively high strength, can be made relatively thin despite grooves and ridges being formed to provide channels. Thus, the stack length can be reduced. However, corrosion by acid water becomes a problem leading to a reduced electrical conductivity and a reduced output. That is, to adopt metal separators, it is necessary that the metal separators be able to maintain good electrical conductivity and good corrosion resistance for a long period.

As a related-art technology, Japanese Patent Application Laid-Open Publication No. 2001-93538 discloses a technology in which a surface of a substrate (stainless steel) of a metal separator of a fuel cell is provided with an electrically conductive film and an acid-resistant film of a metal material different from that of the substrate.

However, the conventional metal separator has a problem of increased cost since the acid-resistant film and the substrate are formed from different metal materials.

SUMMARY OF THE INVENTION

An aspect of the invention provides a separator for a fuel cell. This fuel cell separator includes a metal substrate having an oxide film forming a surface of the substrate and made by an oxidization of a material of the substrate and an electrically conductive thin film formed on a surface of the oxide film. Another aspect of the invention provides a production method for a fuel cell separator. The production method includes the step of forming, on a surface of a substrate, an oxide film from a material of the substrate, and the step of forming an electrically conductive thin film on a surface of the oxide film. According to the fuel cell separator and the production method described above, the electrically conductive thin film achieves low electrical resistance (high electrical conductivity), and the oxide film substantially prevents or reduces elution from the separator substrate and therefore achieves high corrosion resistance even if the electrically conductive thin film has pinholes. Furthermore, since the oxide film is an oxide film made by an oxidization of a material of the substrate, the formation of the oxide film costs less than the formation of an oxide film by an oxidization of a different material.

BRIEF DESCRIPTION OF THE DRAWINGS

The above mentioned embodiment and other embodiments, objects, features, advantages, technical and industrial significance of this invention will be better understood by reading the following detailed description of the exemplary embodiments of the invention, when considered in connection with the accompanying drawings, in which:

FIG. 14A shows sectional views of variation I in fuel cell separators of the invention.

FIG. 14B shows sectional views of variation II in fuel cell separators of the invention.

FIG. 14C shows sectional views of variation III in fuel cell separators of the invention.

FIG. 14D shows sectional views of variation IV in fuel cell separators of the invention.

FIG. 14E shows sectional views of variation V in fuel cell separators of the invention.

FIG. 14F shows sectional views of variation VI in fuel cell separators of the invention.

FIG. 14G shows sectional views of variation VII in fuel cell separators of the invention.

FIG. 14H shows sectional views of variation VIII in fuel cell separators of the invention.

FIG. 14I shows sectional views of variation IX in fuel cell separators of the invention.

FIG. 14J shows sectional views of variation X in fuel cell separators of the invention.

FIG. 14K shows sectional views of variation XI in fuel cell separators of the invention.

FIG. 14L shows sectional views of variation XII in fuel cell separators of the invention.

DESCRIPTION OF THE EXEMPLARY EMBODIMENTS

In the following description and the accompanying drawings, the present invention will be described in more detail in terms of exemplary embodiments.

Figure 1:
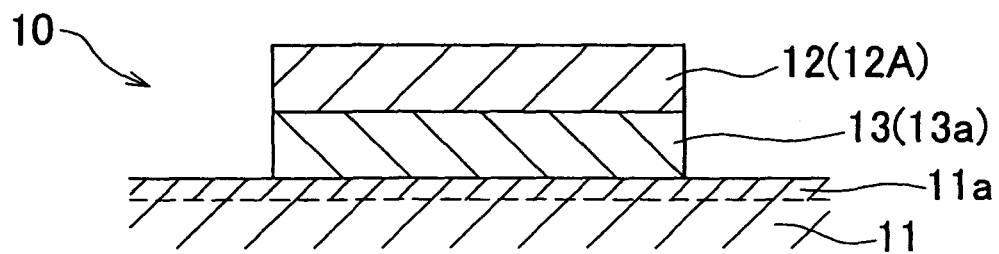
FIG. 1 is an enlarged sectional view of a portion of a fuel cell separator in accordance with Embodiment 1 of the invention.
Figure 2:
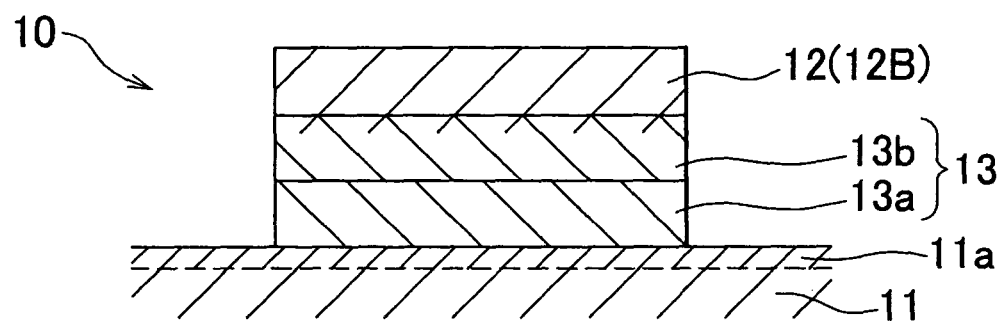
FIG. 2 is an enlarged sectional view of a portion of a fuel cell separator in accordance with Embodiment 2 of the invention.
Figure 3:
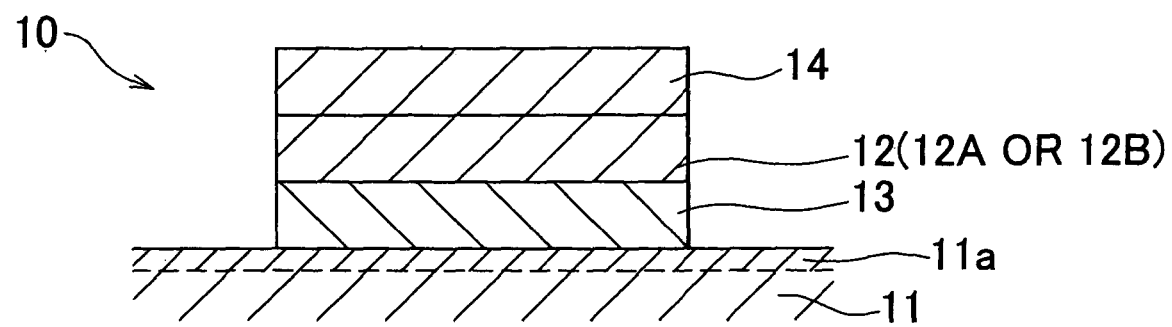
FIG. 3 is an enlarged sectional view of a portion of a fuel cell separator in accordance with Embodiment 3 of the invention.

FIG. 1 illustrates Embodiment 1 (in which the electrically conductive thin film is a metal thin film) of the invention. FIG. 2 illustrates Embodiment 2 (in which the electrically conductive thin film is a carbon thin film formed of carbon (C) at an atomic level) of the invention. FIG. 3 illustrates Embodiment 3 (in which a carbon coating film is formed on the electrically conductive thin film) of the invention. FIGS. 4 to 13 indicate specifications of tests and results of the tests. In Embodiments 1 to 3 of the invention, like portions are represented by like reference characters in the drawings.

The same or similar portions of Embodiments 1 to 3 of the invention will first be described. Fuel cell batteries incorporating separators to which the invention is applied are installed in fuel cell motor vehicles and the like. However, such fuel cell batteries may also be installed in other vehicles or apparatuses. The fuel cells incorporating separators to which the invention is applied are solid polymer electrolyte fuel cells. The structure of a stack formed by stacking MEAs and separators conforms to the structure of ordinary solid polymer electrolyte fuel cell batteries described above in conjunction with the related-art technology.

A fuel cell separator 10 in accordance with the invention is a metal separator as shown in FIG. 1 which has a metal substrate 11 that has, on a surface thereof, an oxide film (passive film) 11a made by an oxidization of a material of the substrate, and an electrically conductive thin film 12 formed on a surface of the oxide film 11a of the substrate 11. Examples of the metal material of the separator substrate 11 include stainless steel (SUS), steel, aluminum (Al), aluminum alloys, titanium (Ti), titanium alloys, etc. Examples of the material of the oxide film 11a in the case where the substrate 11 is made of stainless steel include $Cr_2O_3$, NiO, $Fe_2O_3$, etc. If the substrate is made of Al, the oxide film 11a may be made of $Al_2O_3$. If the substrate is made of Ti, the oxide film 11a may be made of $TiO_2$. If the substrate is made of steel, the oxide film 11a may be made of $Fe_2O_3$. The oxide film 11a may be formed naturally by letting the substrate 11 stand in air, or may also be formed by placing the substrate 11 in an oxidizing atmosphere (oxidizing solution). The oxide film 11a of the substrate improves the corrosion resistant performance of the substrate 11.

The electrically conductive thin film 12 is a metal thin film 12A, or a carbon thin film 12B formed of carbon (C) at an atomic level. Examples of the metal forming the metal thin film 12A include noble metals, an example of which is Au. The carbon thin film 12B is a film built at an atomic level that is, the film 12B is bonded to the substrate oxide film 11a and the like at an atomic level, and does not include a coating film 14 that is formed of a carbon powder and a resin binder. The noble metals and carbon are highly resistant to corrosion. The thickness of the electrically conductive thin film 12 is of the order of nanometers (nm) (it is to be noted that the range of 0.01 to 10 μm is appropriate), and is less than the thickness of the coating film 14, which is several ten micrometers (μm). The electrically conductive thin film 12 may be formed by CVD (chemical vapor deposition) or PVD (physical vapor deposition), including vapor deposition, sputtering, ion plating, etc. To form the metal-based thin film 12A, plating may also be employed.

It is desirable that an intermediate layer 13 for enhancing the adhesion and the corrosion resistance be formed between the oxide film 11a of the substrate and the electrically conductive thin film 12. The formation of the intermediate layer 13 on the oxide film 11a of the substrate is desirable for increasing adhesion and corrosion resistance because the provision of the electrically conductive thin film 12 Alone will result in insufficient corrosion resistance and insufficient adhesion. The provision of the intermediate layer 13 alone will also result in insufficient corrosion resistance and insufficient adhesion. Therefore, it is also desirable to form the electrically conductive thin film 12 on the intermediate layer.

As for the intermediate layer 13, a material and a structure are selected so as to achieve good adhesion to the substrate oxide film 11a and good bonding characteristic thereto, that is, good bonding characteristic to oxygen atom (O), and so as to achieve good adhesion and good bonding characteristic to the electrically conductive thin film 12. If the electrically conductive thin film 12 is a metal thin film 12A as shown in FIG. 1, an Me layer 13a formed of at least one element selected from the group consisting of the metal elements of Ti, Zr, Hf, V, Nb, Ta, Cr, Mo and W and the metalloid elements of Si and B is selected as an intermediate layer 13. These elements have good bonding characteristics to oxygen, and have good adhesion and good bonding characteristic to the oxide film 11a of the substrate. The intermediate layer 13 has good bonding characteristic to the metal thin film 12A since the intermediate layer 13 is formed of metal or metalloid. If the electrically conductive thin film 12 is a carbon thin film 12B formed of carbon (C) at the atomic level, a layer formed by at least one of the following two types of layers is selected as the intermediate layer 13. The two types of layers are: (a) a Me layer 13a formed of at least one element selected from the metal elements of Ti, Zr, Hf, V, Nb, Ta, Cr, Mo and W and the metalloid elements of Si and B; (b) a (carbon-Me) gradient layer 13b which is formed on top of the Me layer 13a and which contains carbon (C) and an element (Me) of metal or metalloid and in which the proportion of carbon (C) increases with increasing distance from the substrate 11. The layer 13a of type (a) has good bonding characteristics to oxygen atom, and has good adhesion and good bonding characteristics to the substrate oxide film 11a. The layer 13b of type (b) has good bonding characteristics to the layer 13a of type (a), and has good adhesion and good bonding characteristics to the carbon thin film 12B.

As shown in FIG. 3, a carbon (c) coating film 14 may be formed on top of the electrically conductive thin film 12. In that case, the structure of the surface-treated layer is formed by the substrate 11, the substrate oxide film 11a on a substrate surface, the intermediate layer 13 provided if necessary, the electrically conductive thin film 12 formed by the metal thin film 12A or the carbon thin film 12B formed of carbon (C) at the atomic level, and the C coating film 14 in that order. However, the provision of the C coating film 14 is not essential.

If the electrically conductive thin film 12 is the carbon thin film 12B built of carbon (C) at the atomic level as shown in FIG. 2, the intermediate layer 13 and the carbon thin film 12B may be formed as in Variations (modifications) I to XII shown in FIG. 14. In FIG. 14, the term "metal separator" refers to a unit of the substrate 11 and the substrate oxide film 11a provided on the surface of the substrate 11. Furthermore, "Me" indicates a layer formed of at least one element selected from the metal elements of Ti, Zr, Hf, V, Nb, Ta, Cr, Mo and W and the metalloid elements of Si and B. The term "MeC" indicates a carbide of the aforementioned Me element. The "MeC gradient layer" is a layer in which the composition changes from Me to C in a gradient fashion in the direction of thickness. A combination of two kinds of elements, such as "Me(A)" and "Me(B)" where Me(A)=W (tungsten) Me(B)=Cr (chrome), and a combination of more than two kinds of elements are also possible. The "carbon+Me or MeC layer" is a layer in which Me or MeC is compounded by an atomic level fabrication in an outermost surface carbon layer. The symbol "+" indicates compounding.

Variations I to XII shown in FIG. 14 will be described.

Variation I is formed of a metal separator, an Me or MeC layer, a carbon-Me or MeC gradient layer, and a carbon layer (C thin film).

Variation II is formed of a metal separator, a carbon-Me or MeC gradient layer, and a carbon layer (C thin film).

Variation III is formed of a metal separator, an Me or MeC layer, and a carbon layer (C thin film).

Variation IV is formed of a metal separator, and a carbon-Me or MeC gradient layer.

Variation V is formed of a metal separator, an Me(B) or Me(B)C layer, an Me(A) or Me(A)C-Me(B) or Me(B)C gradient layer, a carbon-Me(A) or Me(A)C gradient layer, and a carbon layer (C thin film).

Variation VI is formed of a metal separator, an Me(A) or Me(A)C-Me(B) or Me(B)C gradient layer, a carbon-Me(A) or Me(A)C gradient layer, and a carbon layer (C thin film).

Variation VII is formed of a metal separator, an Me(B) or Me(B)C layer, an Me(A) or Me(A)C layer, and a carbon layer (C thin film).

Variation VIII is formed of a metal separator, an Me(A) or Me(A)C-Me(B) or Me(B)C gradient layer, a carbon-Me(A) or Me(A)C gradient layer, and a carbon layer (C thin film).

Variation IX is formed of a metal separator, an Me or MeC layer, a carbon+Me or MeC-Me or MeC gradient layer, and a carbon+Me or MeC layer.

Variation X is formed of a metal separator, a carbon+Me or MeC-Me or MeC gradient layer, and a carbon+Me or MeC layer.

Variation XI is formed of a metal separator, an Me or MeC layer, and a carbon+Me or MeC layer.

Variation XII is formed of a metal separator, and a carbon+Me or MeC-Me or MeC gradient layer.

Constructions of various embodiments of the invention will next be described.

Embodiment 1

A fuel cell separator 10 in accordance with Embodiment 1 of the invention includes a metal substrate 11 having, on its surface, an oxide film 11a made by an oxidization of a material of the substrate itself, an intermediate layer 13 formed on the substrate 11, and an electrically conductive thin film 12 formed on the intermediate layer 13. The electrically conductive thin film 12 is a metal thin film 12A. The intermediate layer 13 is a Me layer 13a formed of at least one element selected from the metal elements of Ti, Zr, Hf, V, Nb, Ta, Cr, Mo and W and the metalloid elements of Si and B.

Embodiment 2

A fuel cell separator 10 in accordance with Embodiment 2 of the invention includes a metal substrate 11 having, on its surface, an oxide film 11a made by an oxidization of a material of the substrate itself, an intermediate layer 13 formed on the substrate 11, and an electrically conductive thin film 12 formed on the intermediate layer 13. The electrically conductive thin film 12 is a carbon thin film 12B built of carbon (C) at the atomic level. The intermediate layer 13 is formed by at least one the following two layers: a layer (Me) 13a formed of at least one element selected from the metal elements of Ti, Zr, Hf, V, Nb, Ta, Cr, Mo and W and the metalloid elements of Si and B; and a (carbon-Me) gradient layer 13b which is formed on top of the layer (Me) 13a and which contains carbon (C) and an element (Me) of metal or metalloid and in which the compounding proportion of carbon (C) increases with increasing distance from the substrate.

Embodiment 3

In a fuel cell separator 10 in accordance with Embodiment 3 of the invention, a C coating film 14 is formed on the electrically conductive thin film 12 of a fuel cell separator similar to the separator of Embodiment 1 or 2 of the invention.

Operation of the invention will next be described. In the fuel cell separator 10 in accordance with the invention, the substrate 11 of the metal separator has, on its surface, the oxide film 11a made by an oxidization of a material of the substrate itself, and the oxide film 11a has, on its surface, the electrically conductive thin film 12. Therefore, low electrical resistance is achieved by the electrically conductive thin film 12, thereby providing a highly electrically conductive separator. Even if the electrically conductive thin film 12 has pinholes, the oxide film 11a substantially prevents or reduces elution from the separator substrate 11, thereby achieving high corrosion resistance of the separator. Furthermore, since the oxide film 11a is an oxide film made by an oxidization of a material of the substrate 11 itself, the formation of the oxide film 11a costs less than the formation of an oxide film from a different metal as in the aforementioned related-art technology (patent literature 1).

Furthermore, since the intermediate layer 13 for enhancing the adhesion is formed between the oxide film 11a of the substrate itself and the electrically conductive thin film 12, good adhesion of the surface-treated layer 12, 13 to the substrate 11 is secured. Therefore, the durability of the separator improves, and high electrical conductivity and high corrosion resistance of the separator are maintained for a long period.

Furthermore, if the C coating film 14 is formed on the electrically conductive thin film 12 of the surface-treated layer, the reliability associated with durability further improves corresponding to the formation of the C coating film 14, in addition to improvements of the surface-treated layer in electrical conductivity, corrosion resistance and adhesion.

Fuel cell separators 10 in accordance with the invention and comparative examples were tested with respect to corrosion resistance, contact electrical resistance and adhesion. Results of the tests concerning the separators of the invention on the one hand and the comparative examples on the other hand were compared. The comparison confirmed that the fuel cell separators of the invention had sufficiently high corrosion resistance, sufficiently low contact resistance (high electrical conductivity), and high adhesion of the surface-treated layer, compared with the comparative examples. This will be further described in detail below.

Test pieces used for the tests will first be described. The separators having an electrically conductive thin film of Au, that is, a noble metal, will be referred to as "test pieces 1", and the separators having an electrically conductive thin film of carbon (C) will be referred to as "test pieces 2". In the description below, Condition 4 regarding test pieces 1 and Condition 3 and Condition 4 regarding test pieces 2 represent the invention, and the other conditions represent comparative examples.

Test Pieces 1: Au was used for the electrically conductive thin film

<Condition 1> not treated/substrate is SUS316L (with an oxide film)

<Condition 2> 10 nm Au sputtering (the electrically conductive thin film of Au with a thickness of 10 nm by a sputtering)/substrate is SUS316L (without ion etching (IE), and with an oxide film)

<Condition 3> 10 nm Au sputtering/substrate is SUS316L (with IE in an Ar atmosphere (Ar-IE), and without an oxide film)

<Condition 4 (invention)> 10 nm Au sputtering/10 nm Cr sputtering (the electrically conductive thin film of Cr with a thickness of 10 nm by a sputtering)/substrate is SUS316L (without IE, and with an oxide film)

<Condition 5> 10 nm Au sputtering/10 nm Cr sputtering/substrate is SUS316L (with Ar-IE, and without an oxide film)

Test Pieces 2: carbon was used for the electrically conductive thin film

<Condition 1> not treated/substrate is SUS316L (with an oxide film)

<Condition 2> 50 nm C sputtering (the electrically conductive thin film of carbon with a thickness of 50 nm by a sputtering)/50 nm C→Cr gradient sputtering (the carbon-chromium gradient layer, in a proportion of carbon increasing with increasing distance from substrate, with a thickness of 50 nm by a sputtering)/substrate is SUS316L (with Ar-IE, and without an oxide film)

<Condition 3 (invention)> 50 nm C sputtering/50 nm C→Cr gradient sputtering/substrate is SUS316L (with Ar-light etching (LE, meaning light IE), and with a thin oxide film)

<Condition 4 (invention)> 50 nm C sputtering/50 nm C→Cr gradient sputtering/substrate is SUS316L (without IE, and without a thick oxide film (the same as in Condition 1))

1. Corrosion Resistance Test (1) Corrosion Resistance Test Condition

Figure 4:
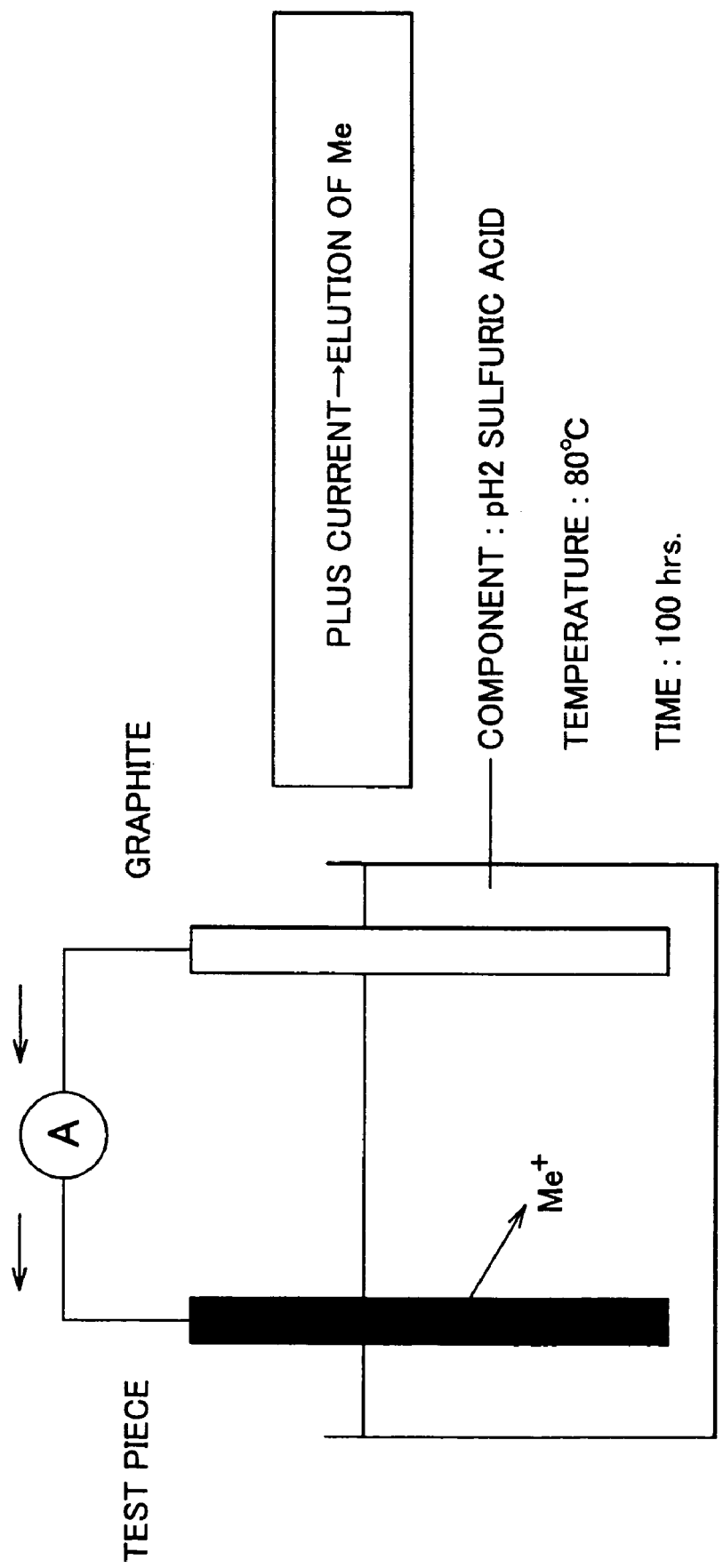
FIG. 4 is a sectional view illustrating the performance of a corrosion resistance test (couple electric current test method) of a fuel cell separator of the invention.

The corrosion resistance test was performed by a couple electric current test method illustrated in FIG. 4. A test piece and a counter electrode (a burned carbon, i.e., graphite, contacting the separator in a fuel cell) were placed in an acidic aqueous solution (an acidic aqueous solution simulating an environment to which the separator of a fuel cell is exposed, and a sulfuric acid solution of pH 2 was used in this test). While the temperature was set at 80° C., that is, an operation temperature of the fuel cell, the electric current density at the time of elution of separator metal Me in the form of ions was measured by an ammeter set on an external circuit of the counter electrode. The corrosion time was set at 100 hours. The plus current is a current occurring at the time of elution of Me in the form of positive ions, and means induction of corrosion. Zero or minus current means freedom from problems in corrosion or corrosion resistance.

(2) Quantification of Elution of Ions

The corrosive solution was analyzed by ICP (induced coupled plasma emission spectroscopy) to determine the quantity of the aforementioned ion elution.

(3) Results of Corrosion Resistance Test

Figure 5:
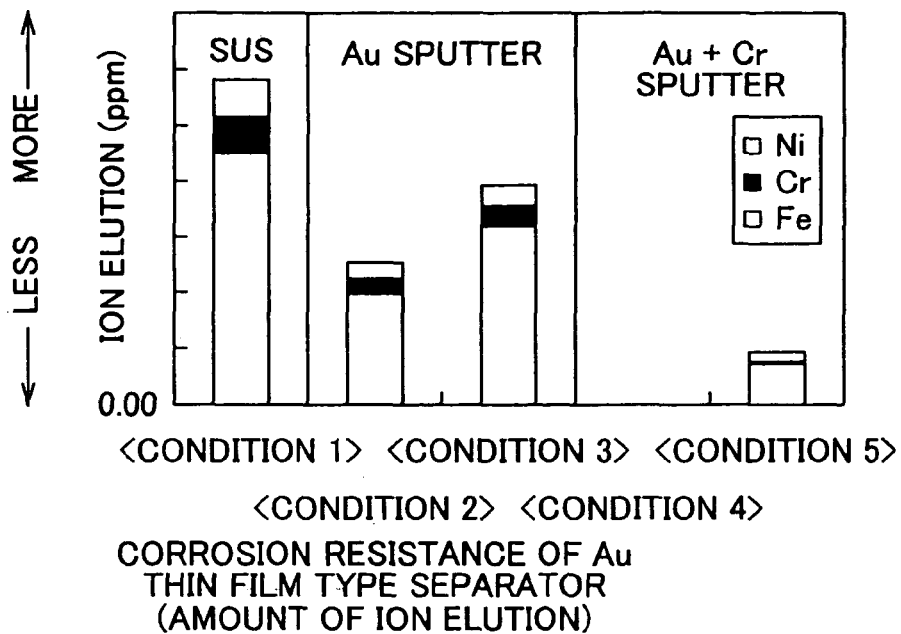
FIG. 5 is a bar graph indicating results of the corrosion resistance test of fuel cell separators of the invention (the amounts of ion elution from test pieces 1 of Condition 1 to Condition 5)

Results of the test regarding the amount of ion elution from the SUS substrates of the Au thin film type test pieces 1 of Condition 1 to Condition 5 are indicated in FIG. 5. In the bar chart of FIG. 5, the test pieces 1 of Condition 1, Condition 2, Condition 3, Condition 4 and Condition 5 are sequentially indicated from the left. Of the three segments of each bar in FIG. 5, the top segment indicates the amount of Ni elution from the SUS substrate, and the intermediate segment indicates the amount of Cr elution from the SUS substrate, and the bottom segment indicates the amount of Fe elution from the SUS substrate. With regard to the test piece 1 of the invention of Condition 4, the amounts of elution of Ni, Cr and Fe ions were less than the measuring range lower limit, and can be considered substantially no elution.

Figure 6:
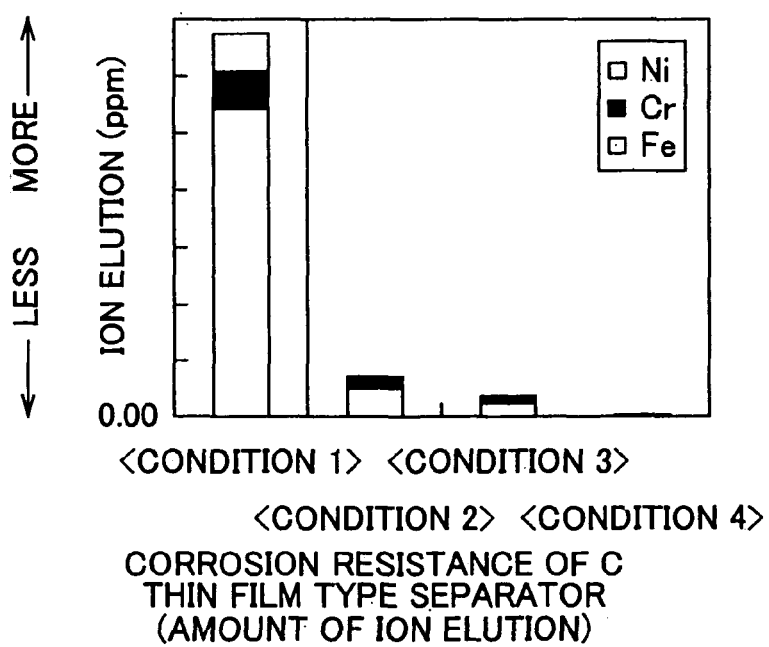
FIG. 6 is a bar graph indicating results of the corrosion resistance test of fuel cell separators of the invention (the amounts of ion elution from test pieces 2 of Condition 1 to Condition 4)

Results of the test regarding the amount of ion elution from the SUS substrates of the C thin film type test pieces 2 under Condition 1 to Condition 4 are indicated in FIG. 6. In the bar chart of FIG. 6, the test pieces 2 of Condition 1, Condition 2, Condition 3 and Condition 4 are indicated sequentially from the left. Of the three segments of each bar in FIG. 6, the top segment indicates the amount of Ni elution from the SUS substrate, and the intermediate segment indicates the amount of Cr elution from the SUS substrate, and the bottom segment indicates the amount of Fe elution from the SUS substrate.

With regard to the test pieces of the invention of Condition 3 and Condition 4, the amounts of elution of Ni, Cr and Fe ions were less than in the cases of the test pieces of Condition 1 and Condition 2, thus indicating improvements in corrosion resistance.

The results of the corrosion resistance test can be summarized as follows.

The test pieces of the invention with the oxide film 11a had good corrosion resistance (elution resistance), regardless of the presence or absence of the intermediate Cr layer 13.

As for the C thin film type test pieces, the corrosion resistance improved with increases in the amount of the oxide film 11a remaining.

2. Electrical Conductivity Test (1) Electrical Conductivity Test Condition

Figure 7:
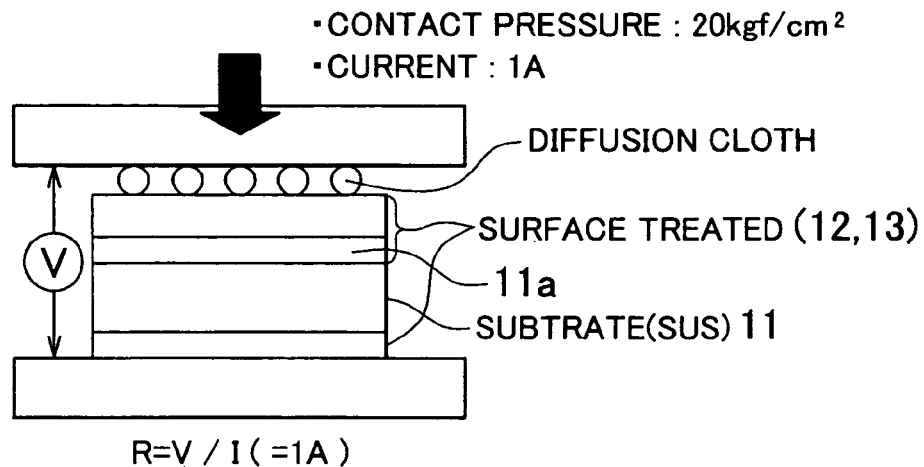
FIG. 7 is a sectional view illustrating the performance of an electrical conductivity test (contact electrical resistance test method) of a fuel cell separator of the invention.

The electrical conductivity test was performed by a contact resistance test method illustrated in FIG. 7. The electrical contact resistance was measured before and after the corrosion resistance test. The test pieces used for the resistance measurement were the same as the test pieces 1 of Condition 1 to Condition 5 and the test pieces 2 of Condition 1 to Condition 4 in the aforementioned corrosion resistance test, in which the substrate 11 (having an oxide film 11a on a surface) was surface-treated. Each test piece was sandwiched with an intervening diffusion cloth (a carbon cloth identical to the one incorporated as a diffusion layer in a fuel cell) between polar plates. After the planar contact pressure was set at 20 kgf/cm$^2$, which is close to the planar contact pressure of a fuel cell, and the current was set at 1 A, the voltage V between the two polar plates was measured. Then, a contact resistance was determined as in the following equation:

Resistance $R=V/I(I=1A)$ (2) Results of Electrical Conductivity Test

Figure 8:
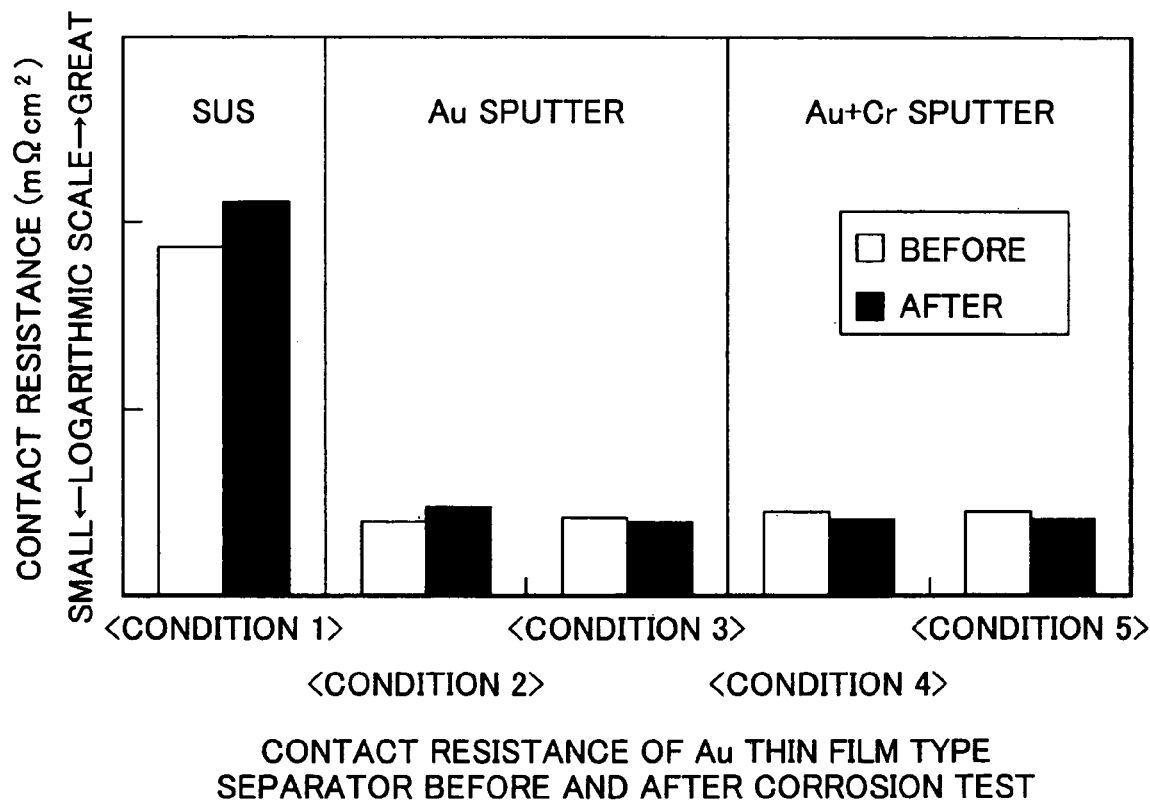
FIG. 8 is a bar graph indicating results of the electrical conductivity test of fuel cell separators of the invention (the contact electrical resistances of test pieces 1 of Condition 1 to Condition 5 before and after the corrosion)

Results of measurement of the contact electrical resistance of the Au thin film type test pieces 1 of Condition 1 to Condition 5 (the same specifications as in Condition 1 to Condition 5 of the Au thin film type test pieces 1 in the corrosion resistance test) are indicated in FIG. 8. The five pairs of bars in FIG. 8 indicate the test pieces 1 of Condition 1, Condition 2, Condition 3, Condition 4 and Condition 5 in that order from the left. Of the two bars for each condition in FIG. 8, the left side bar indicates the contact resistance before the corrosion, and the right side bar indicates the contact resistance after the corrosion. The test piece of the invention of Condition 4 exhibited low contact resistance.

Figure 9:
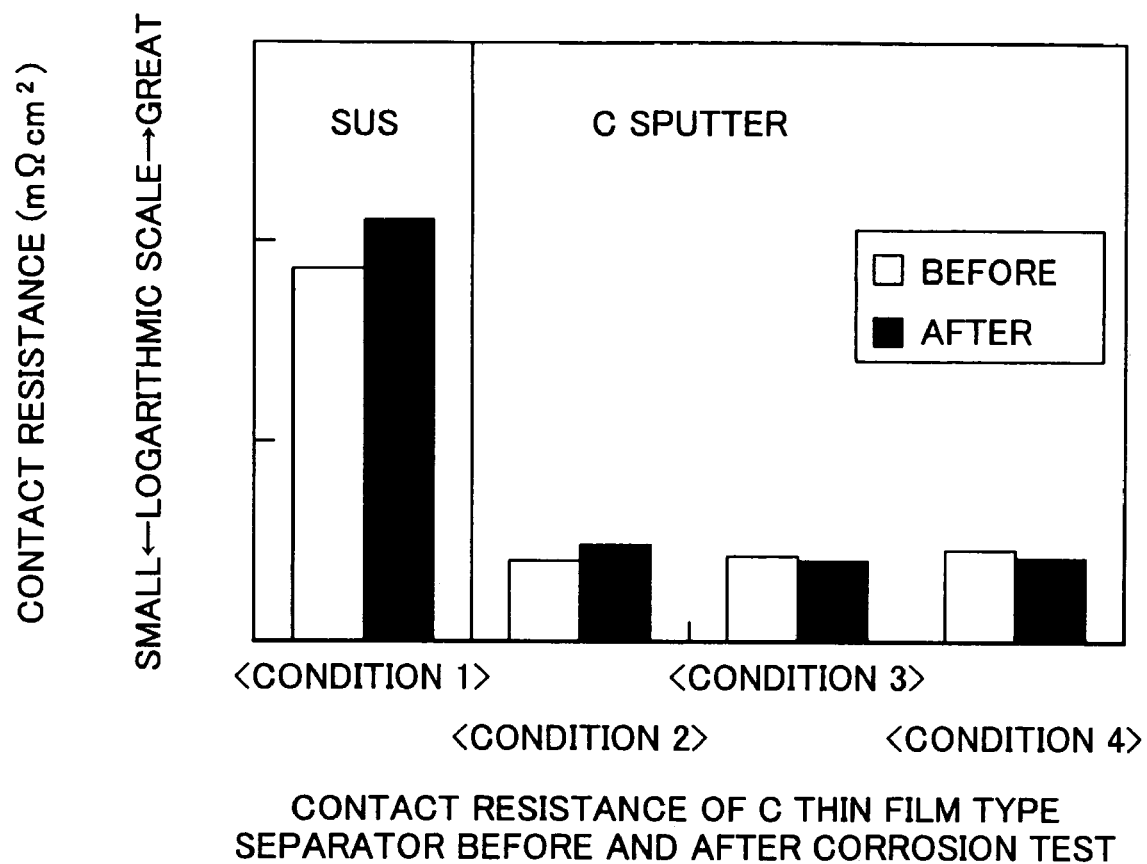
FIG. 9 is a bar graph indicating results of the electrical conductivity test of fuel cell separators of the invention (the contact electrical resistances of test pieces 2 of Condition 1 to Condition 4 before and after the corrosion)

Results of measurement of the contact electrical resistance of the C thin film type test pieces 2 of Condition 1 to Condition 4 (the same specifications as in Condition 1 to Condition 4 of the C thin film type test pieces 2 in the corrosion resistance test) are indicated in FIG. 9. The four pairs of bars in FIG. 9 indicate the test pieces 2 of Condition 1, Condition 2, Condition 3 and Condition 4 in that order from the left. Of the two bars for each condition in FIG. 9, the left side bar indicates the contact resistance before the corrosion, and the right side bar indicates the contact resistance after the corrosion. The test pieces of the invention of Condition 3 and Condition 4 exhibited low contact resistance.

The results of the electrical conductivity test can be summarized as follows.

The results indicate that the surface treatment (formation of the electrically conductive thin film 12) achieved lower contact resistances, regardless of the presence or absence of the oxide film 11a on the surface of the SUS substrate 11.

The reason for this can be considered as follows. As indicated in the conceptual diagram of FIG. 10, the resistance in the direction perpendicular to the plane of the separator includes the contact resistance between the diffusion layer and the separator, the specific resistance of the substrate oxide film, etc. However, it is the contact resistance between the diffusion layer and the separator that makes up a major portion of the resistance. The specific resistance of the substrate oxide film or the like contributes merely to a small extent since the thickness of the substrate oxide film is as small as several nanometers. Therefore, as the contact resistance between the diffusion layer and the separator is reduced by formation of the electrically conductive thin film 12, the resistance in the direction perpendicular to the plane of the separator considerably reduces. In contrast, the resistance increase attributed to the oxide film 11a does not considerably affect the increase in resistance in the direction perpendicular to the plane of the separator. It is considered that the electrical resistance in the direction perpendicular to the plane of the separator reduces as a whole.

Figure 10:
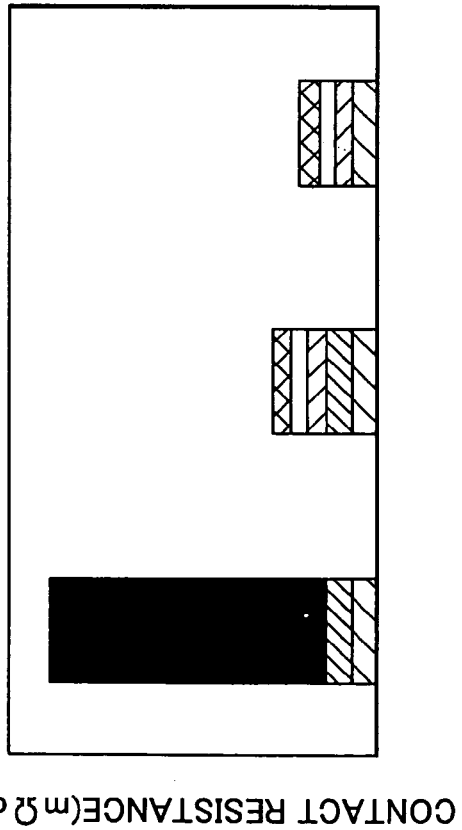
FIG. 10 is a conceptual bar graph indicating the proportions of the contact electrical resistance between the layers or the specific resistance of the layers of each of fuel cell separator test pieces of Condition 1, Condition 4 and Condition 5 determined from the electrical conductivity test.
Figure 10:
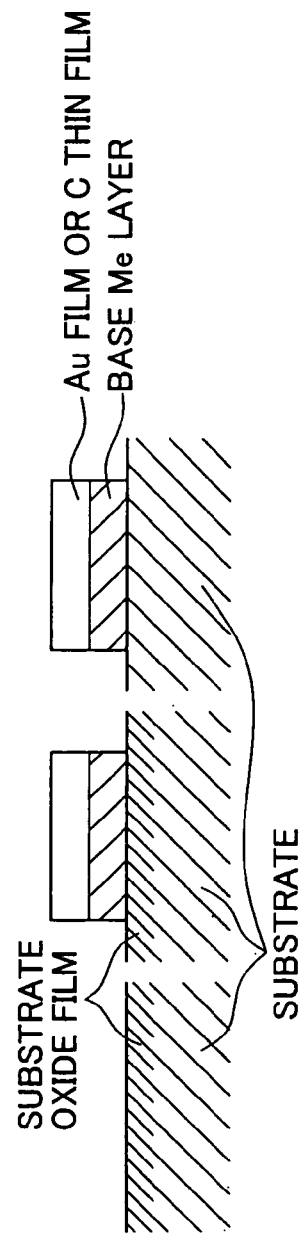

Of the three bars shown in FIG. 10, the left side bar indicates the test piece 1 of Condition 1 according to a comparative example, and the middle bar indicates the test piece 1 of Condition 4 according to the invention, and the right side bar indicates the test piece 1 of Condition 5 according to another comparative example. Of the three segments of the bar of the test piece 1 of Condition 1, the top segment indicates the contact resistance between the diffusion cloth (carbon cloth) and the substrate oxide film, and the intermediate segment indicates the resistance of the substrate oxide film, and the bottom segment indicates the resistance of the SUS substrate. Of the five segments of the bar of the test piece 1 of Condition 4 according to the invention, the first segment from top indicates the contact resistance between the diffusion cloth (carbon cloth) and the electrically conductive thin film, and the second segment from top indicates the resistance of the electrically conductive thin film, and the third segment from top indicates the resistance of a base film (intermediate Me layer), and the fourth segment from top indicates the resistance of the substrate oxide film, and the fifth segment from top indicates the resistance of the SUS substrate. Of the four segments of the bar of the test piece 1 of Condition 5, the first segment from top indicates the contact resistance between the diffusion cloth (carbon cloth) and the electrically conductive thin film, and the second segment from top indicates the resistance of the electrically conductive thin film, and the third segment from top indicates the resistance of a base film (intermediate Me layer), and the fourth segment from top indicates the resistance of the SUS substrate.

3. Adhesion Test (Test of Adhesion Between the Surface-Treated Layer 12, 13 and the Substrate)

(1) Adhesion Test Condition

Figure 11:
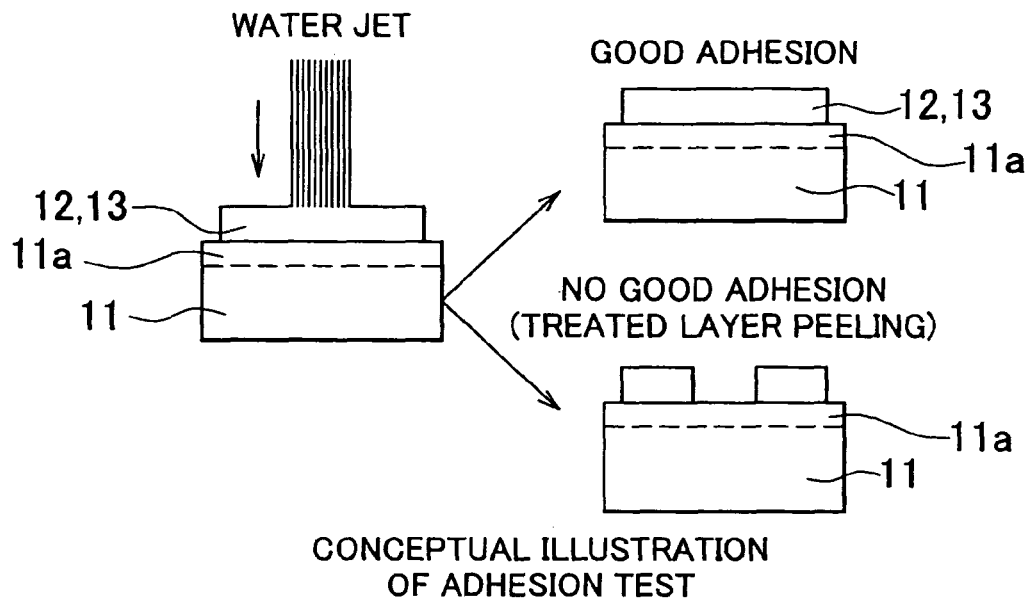
FIG. 11 is a sectional view illustrating the performance of an adhesion test (a test method using water jet) of a fuel cell separator of the invention.

The adhesion test was performed by a water jet test method illustrated in FIG. 11. In the test, the water pressure at a nozzle was about 200 MPa (2000 atm.) The rate of thin film remaining in the water jet test was determined as in the following equation:

Rate of remaining thin film (%)=$M/M_0 \times 100$ where

M is the amount of thin film after water jet (FIG. 14(b)), $M_0$ is the amount of thin film before water jet (FIG. 14(a)).

Elements were provided by fluorescent X-ray or the like.

(2) Results of Adhesion Test

Figure 12:
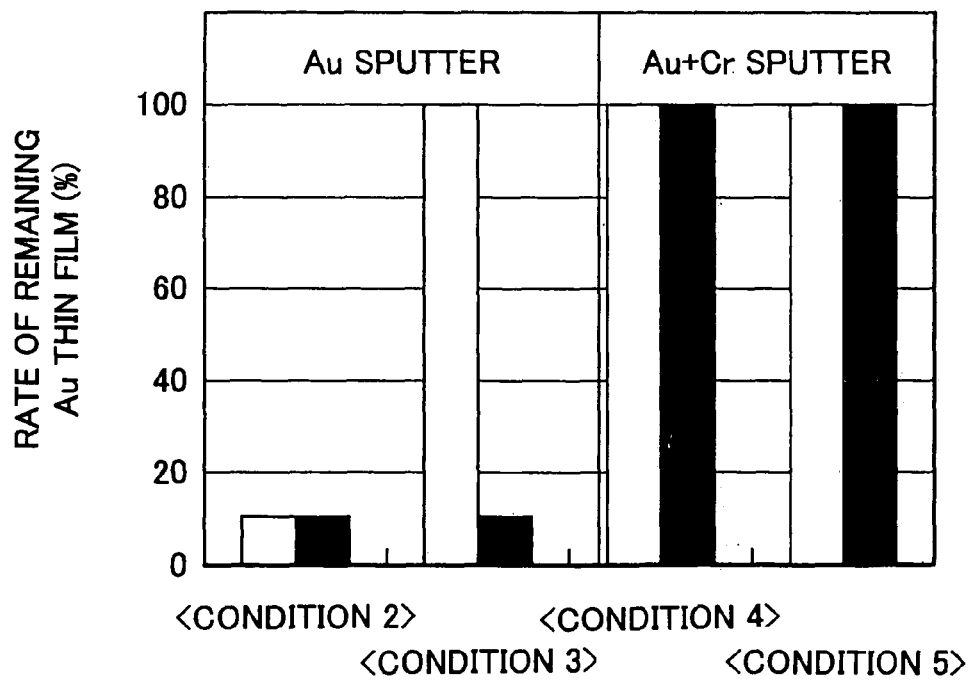
FIG. 12 is a bar graph indicating results of the adhesion test of fuel cell separators of the invention (the rates of remaining Au thin film in test pieces 1 of Condition 2 to Condition 5 before and after the adhesion test)

Results of the adhesion test of the Au thin film type test pieces 1 of Condition 2 to Condition 5 (the same specifications as in Condition 2 to Condition 5 of the Au thin film type test pieces 1 in the corrosion resistance test) are indicated in FIG. 12. The four pairs of bars of the chart of FIG. 12 indicate the test pieces 1 of Condition 2, Condition 3, Condition 4 and Condition 5 in that order from the left. Of the two bars for each condition in FIG. 12, the left side bar indicates the rate of remaining Au thin film before the adhesion test, and the right side bar indicates the rate of remaining Au thin film after the adhesion test. The test piece of Condition 4 according to the invention exhibited high rate of remaining Au thin film (good adhesion).

Figure 13:
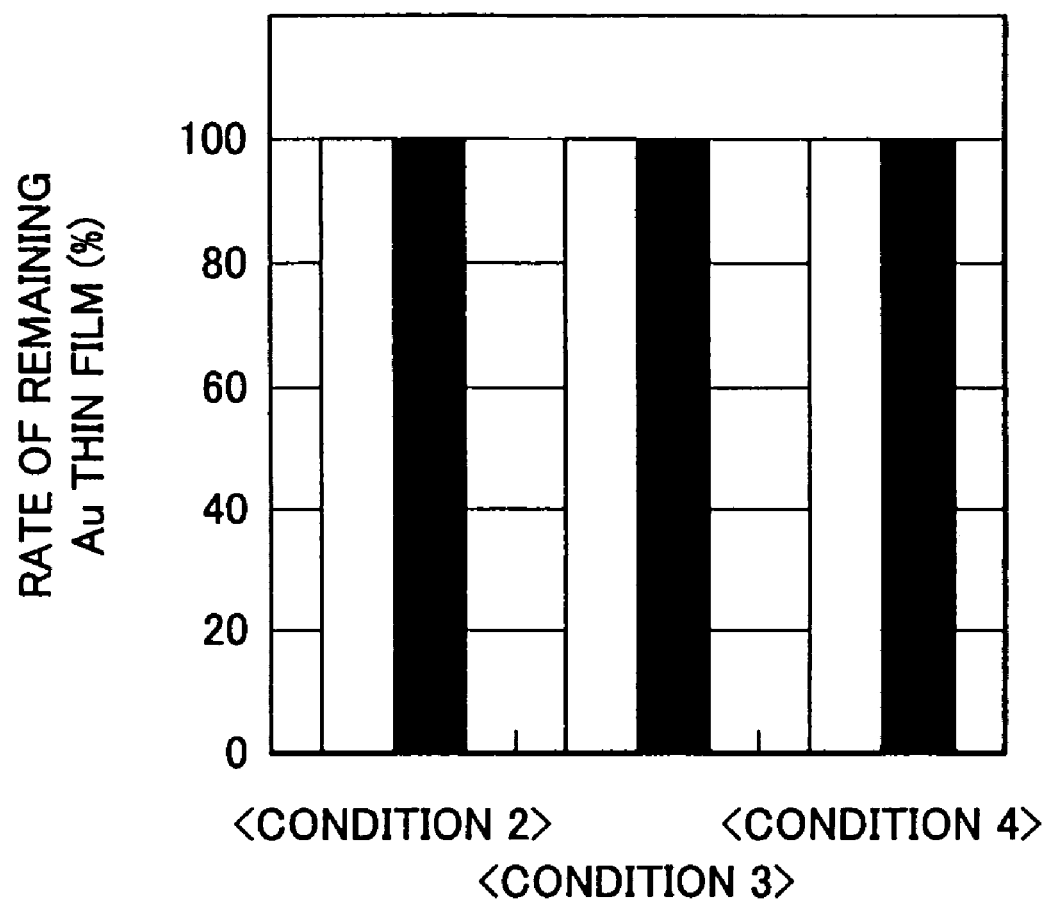
FIG. 13 is a bar graph indicating results of the adhesion test of fuel cell separators of the invention (the rates of remaining C thin film in test pieces 2 of Condition 2 to Condition 4 before and after the adhesion test)

Results of the adhesion test of the C thin film type test pieces 1 of Condition 2 to Condition 4 (the same specifications as in Condition 2 to Condition 4 of the C thin film type test pieces 1 in the corrosion resistance test) are indicated in FIG. 13. The three pairs of bars of the chart of FIG. 13 indicate the test pieces 2 of Condition 2, Condition 3 and Condition 4 in that order from the left. Of the two bars for each condition in FIG. 13, the left side bar indicates the rate of remaining C thin film before the adhesion test, and the right side bar indicates the rate of remaining C thin film after the adhesion test. The test piece of Condition 3 according to the invention exhibited high rate of remaining C thin film (good adhesion).

The results of the adhesion test can be summarized as follows.

Before Adhesion Test

If a base Me layer 13 is not provided, good adhesion can be secured by removing the oxide film 11a via Ar-IE.

If a base Me layer 13a is provided, good adhesion can be secured, regardless of the presence or absence of the substrate oxide film 11a.

After Adhesion Test

If a base Me layer 13a is not provided, the adhesion reduces due to the corrosion of the Au thin film/substrate interface.

If a base Me layer 13a is provided, good corrosion resistance (due to the barrier effect of the base Me layer and improvement in corrosion resistance caused by the substrate oxide film 11a) can be maintained even after the corrosion.

In a fuel cell separator in accordance with the invention, an oxide film is formed, on a surface of a metal separator, from a substrate metal, and an electrically conductive thin film is formed on a surface of the oxide film. Therefore, the fuel cell separator achieves low electrical resistance (high electrical conductivity) due to the electrically conductive thin film. Even if the electrically conductive thin film has pinholes, the oxide film substantially prevents or reduces elution from the separator substrate, thereby achieving high corrosion resistance. Furthermore, since the oxide film is an oxide film of the separator substrate itself, the oxide film can be formed at a lower cost than an oxide film formed from a different metal as in the aforementioned related-art technology (patent literature 1). Furthermore, in a fuel cell separator in accordance with the invention, an intermediate layer for enhancing adhesion is formed between the oxide film made of an oxidization of the substrate material itself and the electrically conductive thin film, so that good adhesion of the surface-treated layer is secured. Therefore, good durability of the separator is achieved, and high electrical conductivity and high corrosion resistance of the separator are maintained for a long period. Still further, in a fuel cell separator in accordance With the invention, a C coating film is formed on top of the electrically conductive thin film. Therefore, the reliability associated with durability further improves corresponding to the formation of the C coating film, in addition to the aforementioned good property of the surface-treated layer (high electrical conductivity).

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A fuel cell separator comprising:
   a metallic substrate having an oxide film forming a surface thereof and made by an oxidization of a material of the substrate;
   an electrically conductive carbon thin film formed of carbon (C) at an atomic level and formed on a surface of the oxide film of the substrate; and
   an intermediate layer for enhancing adhesion, which is provided between the oxide film of the substrate and the electrically conductive carbon thin film,
   wherein the intermediate layer is formed by at least a carbon-Me gradient layer, which contains carbon (C) and a metal or metalloid element (Me) and in which a proportion of carbon (C) increases with increasing distance from the substrate.

2. The separator according to claim 1, wherein
   the intermediate layer is further formed by at least an Me layer formed of at least one element selected from the group consisting of the metal elements of Ti, Zr, Hf, V, Nb, Ta, Cr, Mo and W and the metalloid elements of Si and B.

3. A method of producing a fuel cell separator comprising:
   providing a substrate;
   providing an oxide film forming a surface of the substrate by oxidizing a material of the substrate;
   forming an electrically conductive carbon thin film formed of carbon (C) at an atomic level on a surface of the oxide film of the substrate; and
   forming an adhesion-enhancing intermediate layer between the oxide film of the substrate and the electrically conductive carbon thin film,
   wherein the intermediate layer is formed by at least a carbon-Me gradient layer, which contains carbon (C) and a metal or metalloid element (Me) and in which a proportion of carbon (C) increases with increasing distance from the substrate.

4. The method according to claim 3, wherein
   the intermediate layer is further formed by at least an Me layer formed of at least one element selected from the group consisting of the metal elements of Ti, Zr, Hf, V, Nb, Ta, Cr, Mo and W and the metalloid elements of Si and B.

* * * * *

UNITED STATES PATENT AND TRADEMARK OFFICE
CERTIFICATE OF CORRECTION

PATENT NO. : 7,851,107 B2  
APPLICATION NO. : 11/984155  
DATED : December 14, 2010  
INVENTOR(S) : Hiromichi Nakata It is certified that error appears in the above-identified patent and that said Letters Patent is hereby corrected as shown below:

| Column | Line | |
|---|---|---|
| 5 | 3 | Change "oxide film 1 1a" to --oxide film 11a--. |
| 11 | 57 | Change "With" to --with--. |

Signed and Sealed this  
Twelfth Day of April, 2011

David J. Kappos  
*Director of the United States Patent and Trademark Office*